US011866947B1

(12) United States Patent
Bunch et al.

(10) Patent No.: US 11,866,947 B1
(45) Date of Patent: Jan. 9, 2024

(54) HAND TROWEL AND HAND TROWEL HANDLE FOR USE WITH THE SAME

(71) Applicant: Acufloor, L.L.C., North Richland Hills, TX (US)

(72) Inventors: Clinton D. Bunch, Keller, TX (US); Joshua A. Bunch, Keller, TX (US)

(73) Assignee: Acufloor, LLC

( * ) Notice: Subject to any disclaimer, the term of this patent is extended or adjusted under 35 U.S.C. 154(b) by 0 days.

(21) Appl. No.: 17/938,306

(22) Filed: Oct. 5, 2022

(51) Int. Cl.

| | |
|---|---|
| ***E04F 21/16*** | (2006.01) |
| ***B25G 1/06*** | (2006.01) |
| ***B25G 1/10*** | (2006.01) |

(52) U.S. Cl.
CPC .............. *E04F 21/162* (2013.01); *B25G 1/06* (2013.01); *B25G 1/102* (2013.01)

(58) Field of Classification Search
CPC ....... E04F 21/16; E04F 21/161; E04F 21/162; E04F 21/163; E04F 21/165; E04F 21/1652; B25G 1/06; B25G 1/066; B25G 1/102
USPC ........... 15/143.1, 144.1, 235.4, 235.5, 235.6, 15/235.7, 235.8; 16/430
See application file for complete search history.

(56) References Cited

U.S. PATENT DOCUMENTS

| | | | | |
|---|---|---|---|---|
| 737,831 | A | 9/1903 | Feraud | |
| 747,036 | A | 12/1903 | Bishop | |
| 1,786,043 | A | 7/1927 | Troutner | |
| 2,076,836 | A | 4/1937 | Goldblatt | |
| 2,771,325 | A | 11/1956 | Brunson | |
| 3,146,481 | A | 9/1964 | Chiuchiarelli | |
| 3,166,776 | A | 1/1965 | Selck | |
| 3,916,472 | A | 11/1975 | Carder | |
| 4,724,572 | A | 2/1988 | Gringer | |
| 4,817,231 | A | 4/1989 | Ocwieja | |
| 5,303,445 | A | 4/1994 | Meyers | |
| 5,327,612 | A | 7/1994 | Kelsay | |
| 5,406,671 | A | 4/1995 | Green | |
| 5,446,941 | A | 9/1995 | Kelsay | |
| 5,547,240 | A | 8/1996 | Hartshorn et al. | |
| 5,713,096 | A | 2/1998 | Kelsay et al. | |
| 6,018,841 | A * | 2/2000 | Kelsay | B25G 3/08 15/235.4 |
| 6,223,384 | B1 | 5/2001 | Kuhlen | |
| 6,247,204 | B1 * | 6/2001 | Hamby | B29C 45/1671 16/431 |
| D519,012 | S | 4/2006 | Miller | |

(Continued)

FOREIGN PATENT DOCUMENTS

| | | |
|---|---|---|
| AU | 732071 | 4/2001 |
| CA | 2164065 | 10/2001 |
| CN | 2158902 | 3/1994 |

*Primary Examiner* — Lee D Wilson
*Assistant Examiner* — Alberto Saenz
(74) *Attorney, Agent, or Firm* — Scott Griggs; Griggs Bergen LLP

(57) ABSTRACT

A hand trowel and hand trowel handle for use with the same are disclosed. In one embodiment of the hand trowel handle, a handle has an ergonomic shape and the handle is provided with a discrete, selectively adjustable, rotational angle. A locking member may be tightened into a locked, abutted relationship with the handle to reversibly lock the discrete, selectively adjustable, rotational angle. The locking member may be loosened from the locked, abutted relationship with the handle to provide selective adjustment of the discrete, selectively adjustable, rotational angle.

21 Claims, 4 Drawing Sheets

(56) References Cited

U.S. PATENT DOCUMENTS

| | | | |
|---|---|---|---|
| 7,506,398 B2 | 3/2009 | Martin | |
| 7,694,380 B1 | 4/2010 | Meyers | |
| 7,730,575 B2 | 6/2010 | Huang | |
| 8,151,404 B1 | 4/2012 | Gundlach | |
| 2003/0084545 A1 | 5/2003 | Cheng | |
| 2008/0060159 A1 * | 3/2008 | Martin | B25G 1/06<br>15/235.4 |

* cited by examiner

HAND TROWEL AND HAND TROWEL HANDLE FOR USE WITH THE SAME

CROSS-REFERENCE TO RELATED APPLICATIONS

The present application contains subject matter related to the following co-pending applications: (1) U.S. application Ser. No. 29/867,017 entitled "Trowel Handle" and filed on Oct. 5, 2022 in the names of Clinton D. Bunch et al.; (2) U.S. application Ser. No. 29/867,018 entitled "Trowel Handle" and filed on Oct. 5, 2022 in the names of Clinton D. Bunch et al.; and (3) U.S. application Ser. No. 29/867,019 entitled "Trowel Handle" and filed on Oct. 5, 2022 in the names of Clinton D. Bunch et al.; all of which are hereby incorporated by reference, in entirety, for all purposes.

TECHNICAL FIELD OF THE INVENTION

This invention relates, in general, to tools, such as hand tools, and, in particular, to a hand trowel and hand trowel handle for use with the same that provides improved ergonomics under a variety of work conditions.

BACKGROUND OF THE INVENTION

Without limiting the present invention, the background of the invention will be described with relation to hand trowels. When using a hand trowel, it is common that different work surfaces and work techniques require different angles and different hand grasps on the hand trowel. Handles of hand trowels cannot adjust to the work angle and as a result, ergonomics is lost and inconvenience to the user is created. As a result of these ergonomic challenges, there is a need for improved hand trowels and hand trowel handles for use with the same.

SUMMARY OF THE INVENTION

It would be advantageous to achieve an improved hand trowel and a hand trowel handle for use with the same. It would be desirable to enable a mechanical-based solution that would provide enhanced ergonomics and convenience regardless of the work surface, work angle, or work technique required for a job. In particular, by way of a specific job example, notched hand trowels make up almost the entire market of hand trowels and are intended to be used at an approximate 90-degree angle to the work surface. However, as hand trowel handles in the market are firmly and permanently set in a single position, enhanced ergonomics and convenience are needed. To better address one or more of these concerns, a hand trowel and hand trowel handle for use with the same are disclosed.

In one embodiment of the hand trowel handle, a handle has an ergonomic shape and the handle is provided with a non-discrete, selectively adjustable, rotational angle. A locking member, which may or may be threaded, may be tightened into a locked, abutted relationship with the handle to reversibly lock the discrete, selectively adjustable, rotational angle. The locking member may be loosened from the locked, abutted relationship with the handle to provide selective adjustment of the discrete, selectively adjustable, rotational angle. The hand trowel handle provides an ergonomic handle that may rotate to all relevant real-life work positions, while being secure and not coming loose during long term use that includes constant force being applied during the use. In this manner, the hand trowel handle avoids hand fatigue and hand slippage.

In another embodiment, a hand trowel is provided. The hand trowel may include a hand trowel handle having an ergonomic shape with a discrete, selectively adjustable, rotational angle. In still another embodiment, a hand implement handle for a hand implement is provided. The hand implement handle may be similar to the hand trowel handle and include a handle having an ergonomic shape with a discrete, selectively adjustable, rotational angle as described above. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
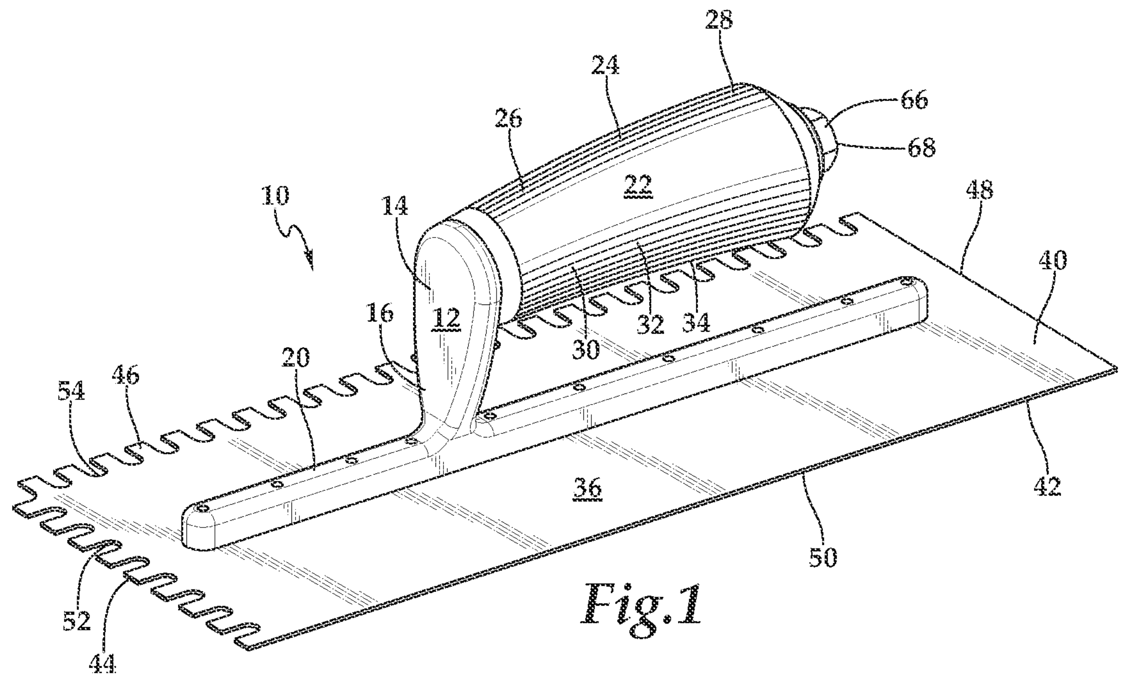
FIG. 1 is a side perspective view of one embodiment of a hand trowel with a hand trowel handle, according to the teachings presented herein.
Figure 2:
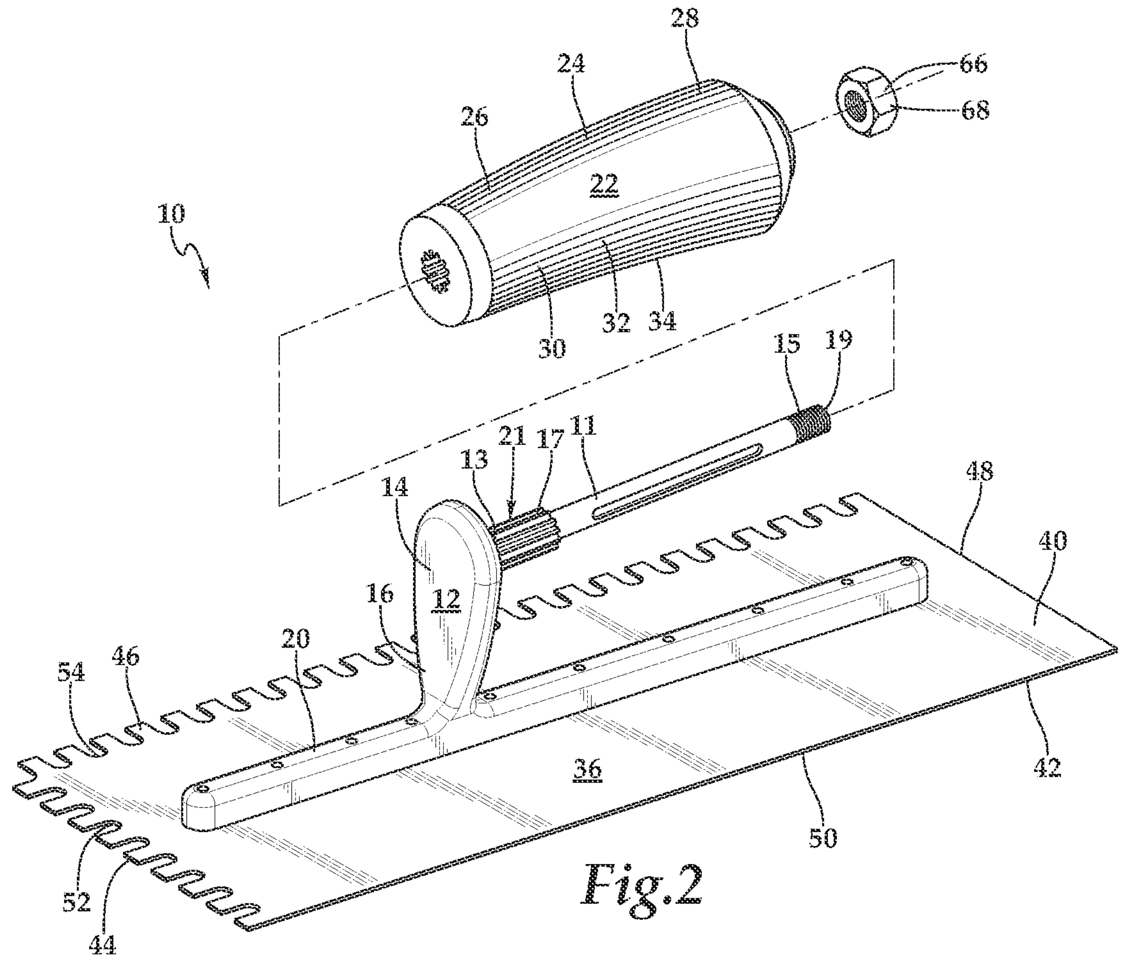
FIG. 2 is a side exploded perspective view of the hand trowel and the hand trowel handle depicted in FIG. 1.
Figure 3:
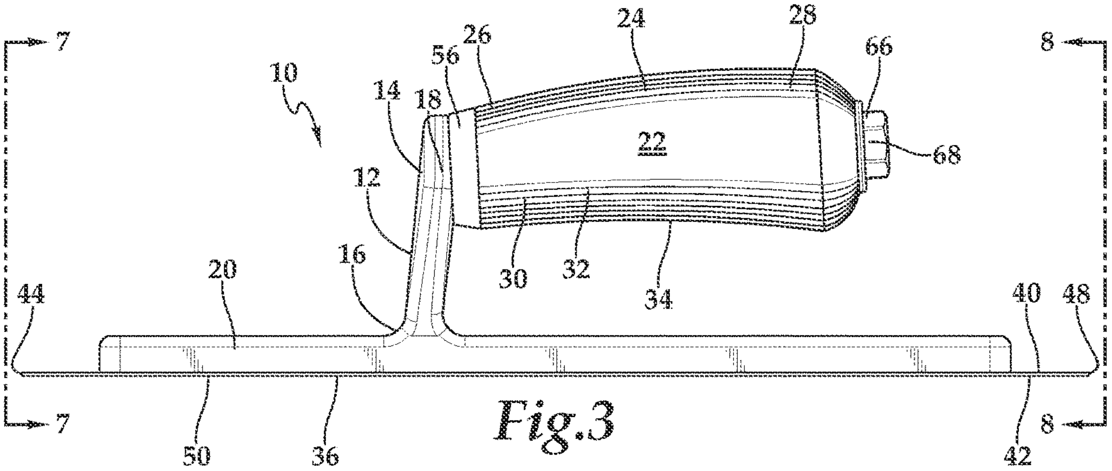
FIG. 3 is a side cross-sectional elevation view of the hand trowel and the hand trowel handle depicted in FIG. 1.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1 through FIG. 9, therein is depicted one embodiment of a hand trowel, which is schematically illustrated and designated 10. In particular, a notched trowel embodiment of the hand trowel 10 is shown that includes a body member 12 having an upper end 14 and a lower end 16. The upper end 14 includes a hub member 18 thereat. The lower end 16 includes a mounting member 20 extending therefrom. A shaft 11 having a proximal end region 13 and a distal end region 15 is secured to the hub member 18 at the proximal end region 13. The proximal end region 13 of the shaft 11 includes external splines circumferentially positioned therearound, including external mating elements 21 depicted in this embodiment as splines 17, in order to circumferentially extend from the shaft 11. In this manner, the external splines 17 increase the surface area of contact on the shaft 11. As a result, the strength of contact is increased, without the need for springs or other mechanisms, as will be discussed in greater detail hereinbelow. That is, the springless design of the shaft 11 and the external splines 17 achieves this increased strength and stability against rotation, in part, because of the increased surface area of contact. The distal end region 15 of the shaft 11 includes threads 19 thereat.

A hand trowel handle 22 is coupled to the upper end 14 of the body member 12 and the hand trowel handle 22 includes a handle 24 with a front end region 26 and a rear end region 28 with a gripping member 30 having a gripping surface 32 with a contour member 34 therebetween. The hand trowel handle 22 permits the hand trowel 10 to be manipulated by hand. The design and selection of the gripping surface 32 may involve substantial ergonomic issues that address a range of universal issues, including sufficient strength to support the trowel, sufficient length to permit a user's hand to grip the handle reliably to exert sufficient force, and appropriately sized circumference to permit the user's hand to grip the handle, among other universal issues. The gripping surface 32 may include an ergonomic material to achieve these ends. The ergonomic material may include plastics, polymers (e.g., polyethylene, polypropylene and abs, EVA, cork, nylon), and fibers (e.g., cotton, polyester, cardboard), as well as rubbers, all of which are preferably non-toxic and non-flammable. As will be discussed in further detail hereinbelow, depending on the specific application of the hand trowel 10, it is desirable to rotate the hand trowel handle 22 to improve the ergonomics of the hand trowel handle 22.

As illustrated, a blade member 36 is coupled to the mounting member 20 of the lower end 16 of the body member 12. The blade member 36 includes an upper surface 40 and a lower surface 42 as well as sides 44, 46, 48, 50. As depicted, the blade member 36 has a rectangular shape with regularly spaced notches 52, 54 along sides 44, 46. The notched hand trowel embodiment of the hand trowel 10 may be utilized to apply adhesive when adhering tile, or laying synthetic floor surfaces, for example, as most adhesive specifications create coverage charts to depict trowel usage at approximately a 90-degree angle. It should be appreciated that the notched trowel embodiment of the hand trowel 10 is presented as a non-limiting example. Numerous forms of hand trowels are used in masonry, concrete, drywall construction, and gardening, as well as applying adhesives such as those used in the tiling and laying of synthetic flooring. Such hand trowels include bricklayer trowels, pointing trowels, float trowels, margin trowels, adhesive spreading trowels, and garden trowels. The teachings presented herein are applicable to all hand trowels and, more generally, all hand implements. By way of example and not by way of limitation, as will be discussed in further detail hereinbelow, in instances where the rectangular spaced notches of the hand trowel are positioned perpendicular to the work surface, it is desirable to rotate the hand trowel handle 22 to improve the ergonomics of the hand trowel 10.

Figure 11:
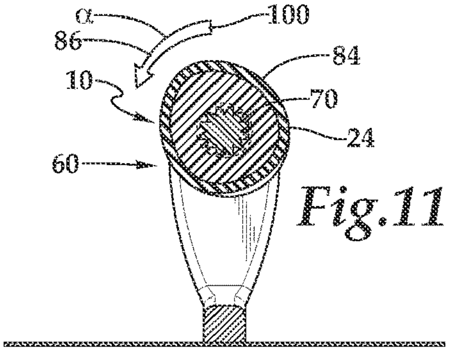
FIG. 11 is a rear cross-sectional elevation view of the hand trowel and the hand trowel handle depicted in FIG. 1, as seen along line 9-9 in FIG. 4 illustrating a second adjustable position for the hand trowel handle.
Figure 12:
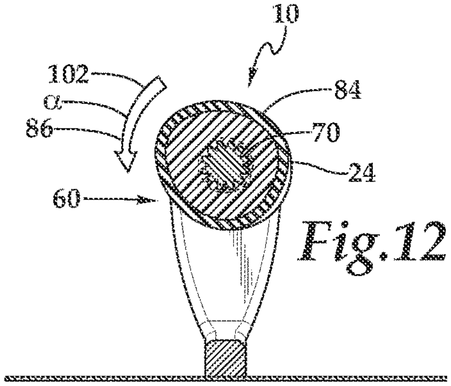
FIG. 12 is a rear cross-sectional elevation view of the hand trowel and the hand trowel handle depicted in FIG. 1, as seen along line 9-9 in FIG. 4 illustrating a third adjustable position for the hand trowel handle, which provides for various ergonomic work needs.

In one embodiment, the hand trowel handle 10 includes a locking type fitting 60 to provide the desirable rotation and positioning of the gripping member 30 as well as interchangeability to the hand trowel 10 and the hand trowel handle 22. As discussed, the hand trowel handle 22 is secured to the upper end 14 of the body member 12 via the shaft 11 and the hand trowel handle 22 includes the handle 24 with the gripping member 30 thereat. As best shown in FIG. 11 and FIG. 12, the gripping member 30 has an ergonomic shape and a discrete, selectively adjustable, rotational angle alpha $\alpha$.

Figure 5:
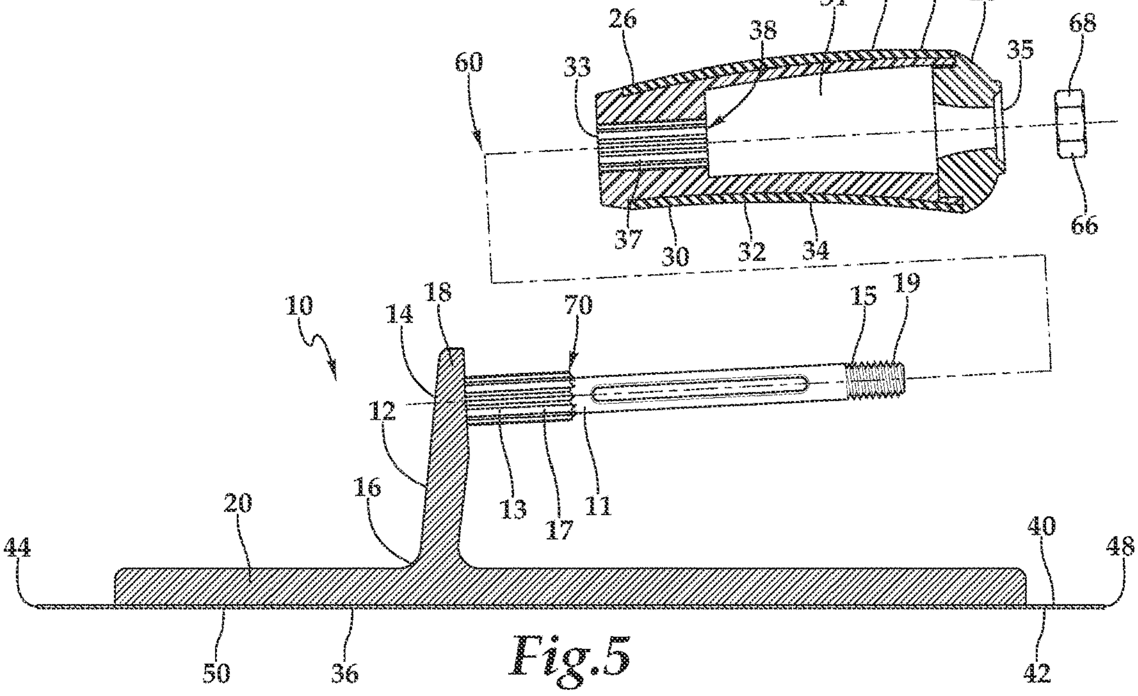
FIG. 5 is a side cross-sectional, exploded elevation view of the hand trowel and hand trowel handle depicted in FIG. 1 in an unlocked, disengaged position to provide for adjustment of the hand trowel handle.
Figure 6:
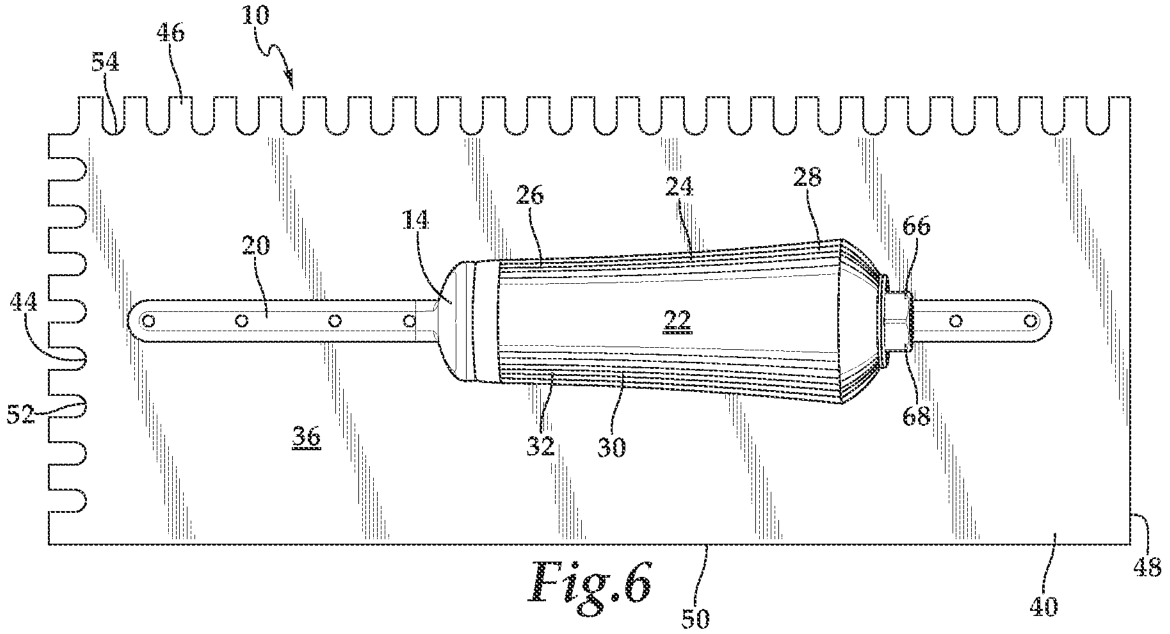
FIG. 6 is a top plan view of the hand trowel and the hand trowel handle depicted in FIG. 1 in a locked, engaged position to provide for discrete, selectively adjustable rotation of the hand trowel handle furnishing multiple handle settings.
Figure 7:
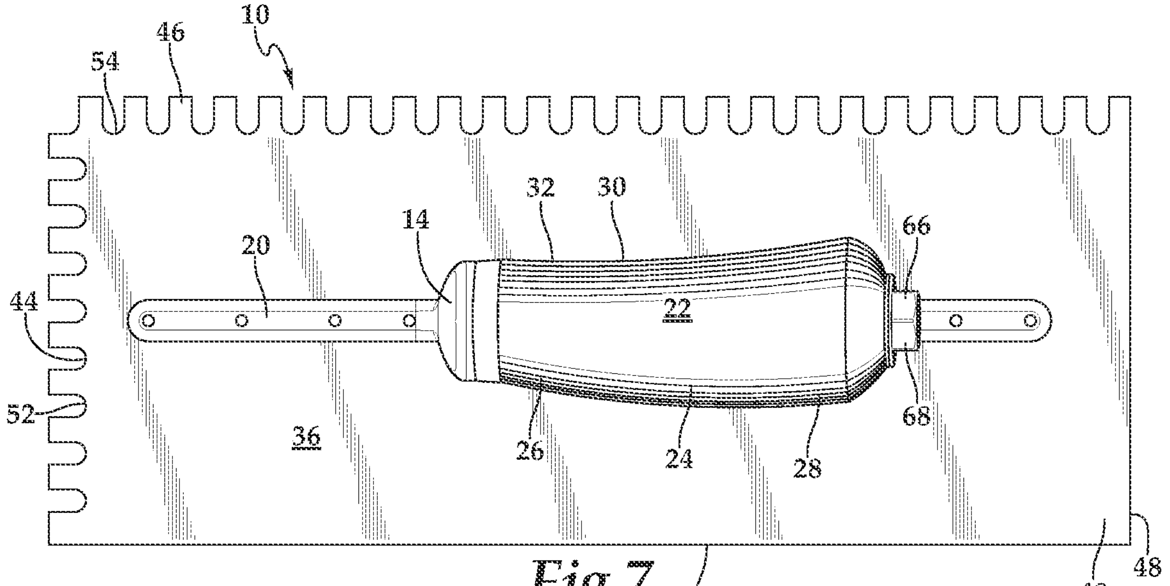
FIG. 7 is a top plan view of the hand trowel and the hand trowel handle depicted in FIG. 1 in another locked, engaged position to provide for discrete, selectively adjustable rotation of the hand trowel handle furnishing multiple handle settings.
Figure 8:
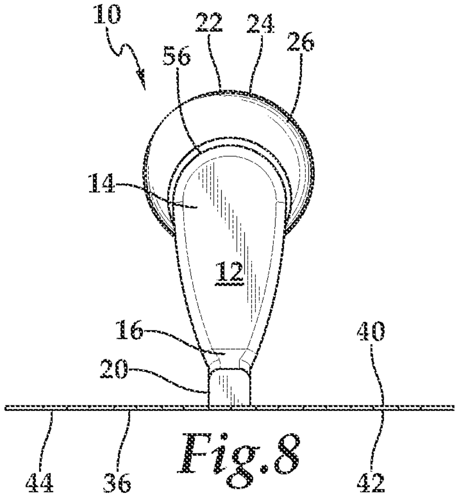
FIG. 8 is a front elevation view of the hand trowel and the hand trowel handle depicted in FIG. 1, as seen along line 7-7 in FIG. 3 illustrating a first adjustable position for the hand trowel handle.
Figure 9:
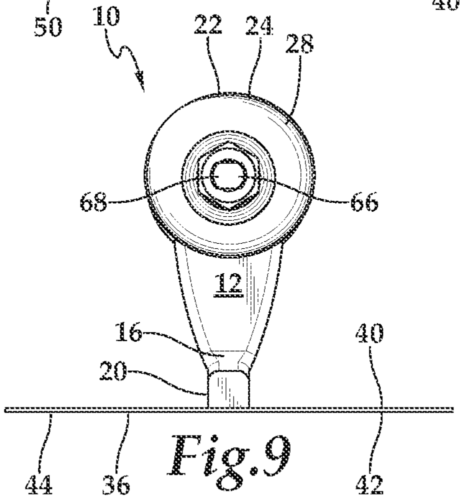
FIG. 9 is a rear elevation view of the hand trowel and the hand trowel handle depicted in FIG. 1, as seen along line 8-8 in FIG. 3 illustrating the first adjustable position for the hand trowel handle.

In one embodiment, the handle has a bore 31 therethrough with a front opening 33 and a rear opening 35, as best shown in FIG. 5. The bore has internal mating elements 38, which are depicted as internal splines 37, circumferentially positioned therearound at the front end region 26. The internal splines 37 of the bore 31 of the handle 24 selectively mate with the external splines 17 of the shaft 11 to define the discrete, selectively adjustable, rotational angle alpha $\alpha$ of the handle 24. The discrete, selectively adjustable, rotational angles may include any number of rotational angles, which is a function of the number of external splines 17 of the shaft 11 and the internal splines 37 of the handle 24. By way of example and not by way of limitation, the selectively adjustable, rotational angle further comprises at least four (4) rotational angles, twelve (12) rotational angles, or twenty-four (24) rotational angles. Further, the handle may have more rotational angles than the internal splines 17. Further still, it should be appreciated that the internal splines 17 and the external splines 37 are examples of internal and external mating elements 21 that also include ridges, wedges, pins, mating features for rotating elements, and the like, for example. That is, in some embodiments, the external mating elements 21 are circumferentially positioned around the shaft 11 and circumferentially extending perpendicularly therefrom to provide a radially varying contact surface having keyways 70. As depicted, the hand trowel handle 22 may include a fastener 66, which is shown, in one embodiment, as a threaded locking member 68 engageable at the rear opening 35 with the threads 19 of the shaft 11. The fastener 66 may be accessible via a cover, not shown.

With the relationship between the external mating elements 21 and the internal mating elements 38, the hand trowel handle provides an ergonomic handle that may rotate to all relevant real-life work positions, while being secure and not coming loose during long term use that includes constant force being applied during the use. With the external mating elements 21 circumferentially positioned around the shaft 11 and circumferentially extending perpendicularly therefrom, a radially varying contact surface is provided having the keyways 70 that increase the surface area of contact between the shaft and the handle and transfer of force therethrough.

Figure 4:
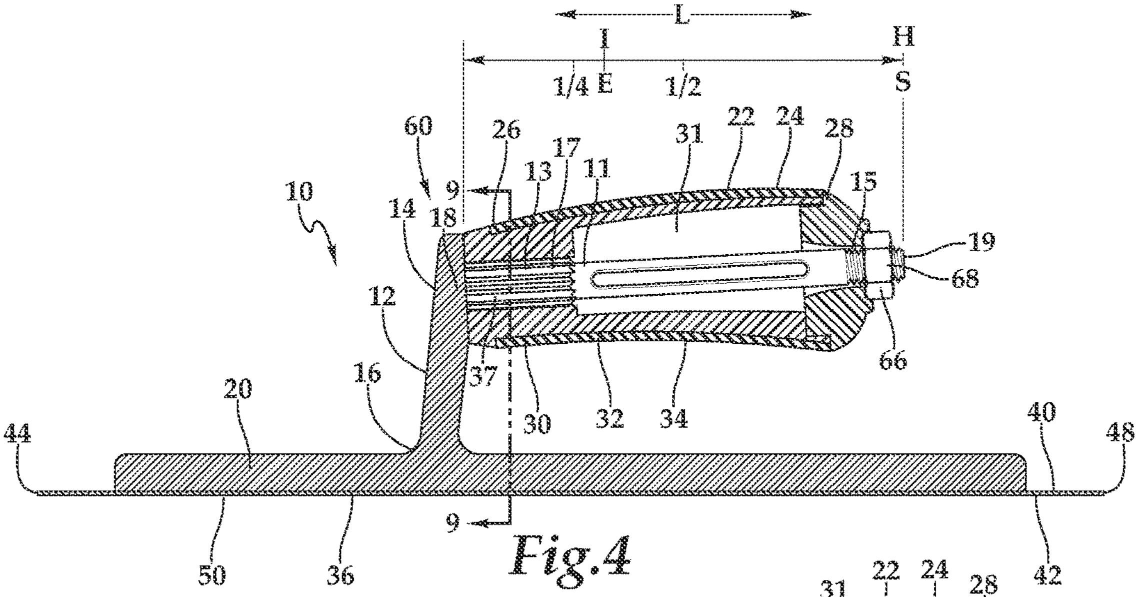
FIG. 4 is a side cross-sectional elevation view of the hand trowel and the hand trowel handle depicted in FIG. 1 in a locked, engaged position to provide for discrete, selectively adjustable rotation of the hand trowel handle furnishing multiple handle settings.

Furthermore, with the use of the external mating elements 21 and internal mating elements 38, multiple adjustment angles are made possible with each angle ensuring secure movement of the shaft and handle moving in unison. As best seen in FIG. 4, in some embodiments, the shaft 11 and the hand trowel handle 22 have approximately the same length L as indicated by shaft length S and handle length H. The external mating elements 21 extend along the shaft 11 for at least one quarter of the shaft length S as indicated by external mating elements length E. Similarly, the internal mating elements 38 extend along the shaft 11 for at least one quarter of the handle length H as indicated by internal mating elements length I. Both the shaft 11 and the hand trowel handle 22 having substantially the same lengths and the external mating elements 21 and the internal mating elements 38 extending more than fifteen percent, and more than twenty percent and more than twenty five percent of the length L increases the surface area of contact. That is, in some embodiments, the handle 24 has the handle length H which approximates the shaft length S of the shaft 11. Therefore, the surface area of contact is improved by the keyways 70 in a radial manner and the surface area of contact is improved by the external mating elements 21 and the internal mating elements 38 in a longitudinal manner. In this way, the hand trowel handle avoids hand fatigue and hand slippage.

Figure 10:
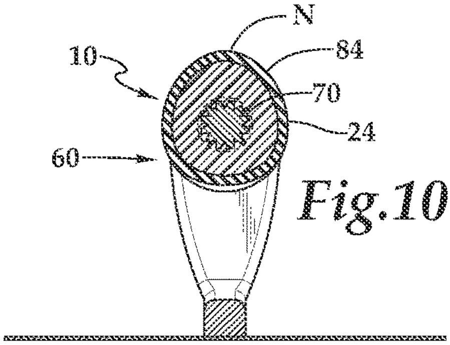
FIG. 10 is a rear cross-sectional elevation view of the hand trowel and the hand trowel handle depicted in FIG. 1, as seen along line 9-9 in FIG. 4 illustrating the first adjustable position for the hand trowel handle.

Referring to FIG. 10, FIG. 11, and FIG. 12, the locking type fitting 60 generally functions by, in one embodiment, having the threaded locking member 68 disengage from and engage with the thread on the shaft. In this embodiment, with the threaded locking member 68 fully disengaged from the thread on the shaft, the handle 24 is in an unlocked, disengaged position that provides for disengagement of the hand trowel handle 22 from the hand trowel 10. With the threaded locking member 68 partially disengaged from the thread on the shaft, the handle 24 is in an unlocked, disengaged position that provides for adjustment of the discrete, selectively adjustable, rotational angle alpha α. With the threaded locking member 68 engaged with the threads 19 of the shaft 11, the handle 24 is in a locked, engaged position 84 that fixes the discrete, selectively adjustable, rotational angle alpha α.

More particularly, the locking type fitting 60 generally functions to provide interchangeability. When the threaded locking member 68 is loosened or other engagement mechanism disengaged from the threads 19 of the shaft 11, the threaded locking member 68 is loosened from the locked, abutted relationship with the handle 24 and the handle 24 may rotate in a direction 86, as shown by arrows 100, 102. The threaded locking member 68 is then in an unlocked, disengaged position 80 providing for disengagement of the hand trowel handle 22 from the hand trowel 10. The rotational angle may be adjusted as desired by the user, in order to obtain a more ergonomic grip in relation to the selected activity. This allows a different gripping position to be utilized with the hand trowel. Alternatively, this allows a different hand trowel or other tool or implement to be utilized with the gripping position member. The hand implement may be selected from the group consisting of rakes, shovels, hoes, scrapers, paint brushes, flashlights, cameras, wrenches, hammers, power washers, handles for crutches, canes, walkers, lawnmower components, tractors, dollies, motorcycles, and artificial limbs.

The locking type fitting 60 generally further functions to provide near infinite adjustability. When the threaded locking member 68 is loosened from the locked, abutted relationship with the handle, the handle 24 is in the unlocked, disengaged position 80 that provides selective adjustment of the discrete, selectively adjustable, rotational angle alpha α. A neutral indicator N and the arrows 100, 102 respectively in FIG. 10, FIG. 11, and FIG. 12 show the discrete, selectively adjustable, rotational angle alpha a at three exemplary positions. As shown, the discrete, selectively adjustable, rotational angle alpha α provides a near infinite selection of positions. Once the discrete, selectively adjustable, rotational angle alpha a is selected, the hand trowel handle 22 is locked. That is, when the threaded locking member 68 is tightened into a locked, abutted relationship with the handle, as shown by arrow 90, with the body member 12 interposed therebetween, the handle 24 is in the locked, engaged position 84 to reversibly lock the discrete, selectively adjustable, rotational angle alpha α.

Figure 13:
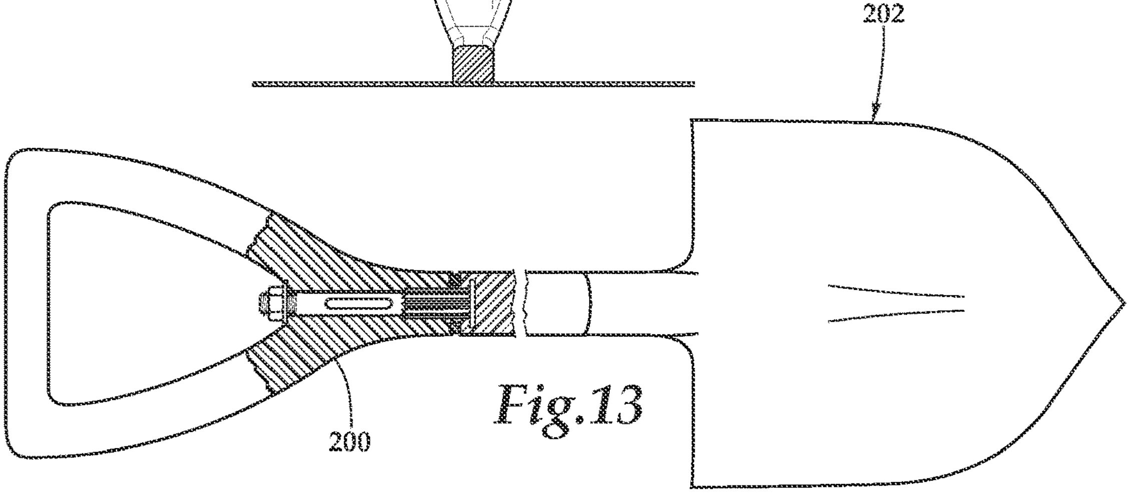
FIG. 13 is a top plan view of one embodiment of a hand implement having a hand implement handle according to the teachings presented herein.

Referring to FIG. 13, in another embodiment, a hand implement handle 200 for a hand implement 202 is provided. The hand implement handle 200 may be similar to the hand trowel handle and include a locking type fitting as described above. The hand implement 202 may be selected from the group consisting of rakes, shovels, hoes, scrapers, paint brushes, flashlights, cameras, wrenches, hammers, power washers, handles for crutches, canes, walkers, lawnmower components, tractors, dollies, motorcycles, and artificial limbs. In some such applications, it should be appreciated that two or more locking type fittings as described above may be utilized with the hand implement 202. The number and location of the locking type fittings will depend on the engineering of the specific hand implement.

Figure 14:
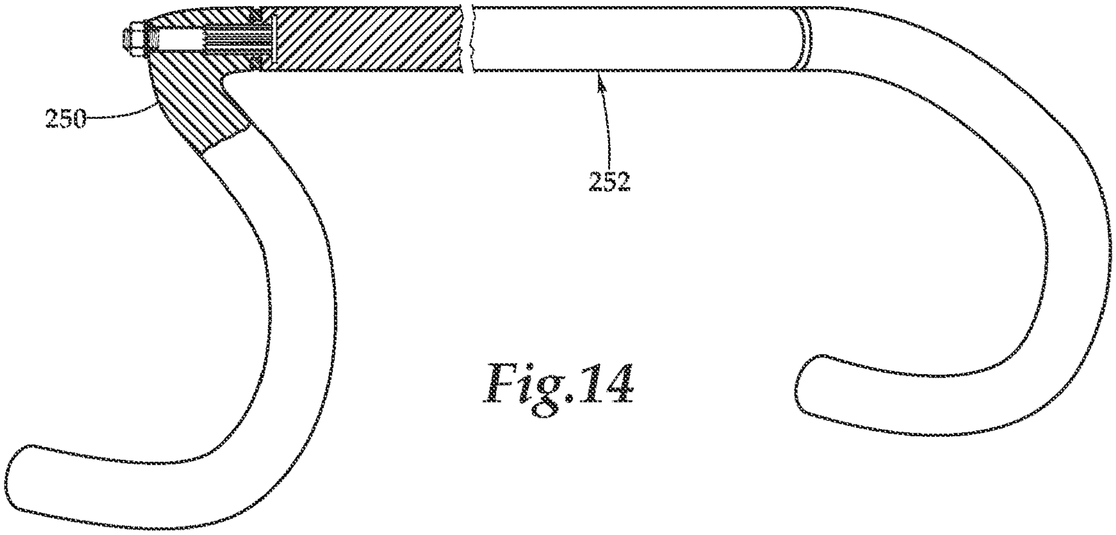
FIG. 14 is a top plan view of another embodiment of a hand implement having a hand implement handle according to the teachings presented herein.

Referring to FIG. 14, in still another embodiment, a hand implement handle 250 for a hand implement 252 is provided. The hand implement handle 200 may be similar to the hand trowel handle and include a locking type fitting as described above. The hand implement 252 may be selected from the group consisting of rakes, shovels, hoes, scrapers, paint brushes, flashlights, cameras, wrenches, hammers, power washers, handles for crutches, canes, walkers, lawnmower components, tractors, dollies, motorcycles, and artificial limbs. In some such applications, it should be appreciated that two or more locking type fittings as described above may be utilized with the hand implement 252. The number and location of the locking type fittings will depend on the engineering of the specific hand implement.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A hand trowel comprising:

a body member having an upper end and a lower end, the upper end including a hub member thereat, the lower end having a mounting member extending therefrom;

a shaft having a proximal end region and a distal end region, the proximal end region being secured to the hub member such that the shaft extends therefrom, the proximal end region having a plurality of external mating elements circumferentially positioned therearound and circumferentially extending perpendicularly therefrom to provide a radially varying contact surface having a plurality of keyways;

a blade member secured to the mounting member of the lower end;

a hand trowel handle secured to the upper end of the body member, the hand trowel handle including:

a handle having a front end region and a rear end region with a gripping member therebetween, the gripping member having an ergonomic shape and a discrete, selectively adjustable, rotational angle, the handle having a handle length which approximates a shaft length of the shaft, the handle having a bore therethrough with a front opening and a rear opening, the bore having a plurality of internal mating elements circumferentially positioned therearound at the front end region, the plurality of internal mating elements selectively mating with the plurality of external mating elements to define a selectively adjustable, rotational angle of the handle, and a locking member engageable with the shaft;

wherein upon the locking member being tightened into a locked, abutted relationship with the handle, the handle being in a locked, engaged position to reversibly lock the selectively adjustable, rotational angle; and wherein upon the locking member being loosened from the locked, abutted relationship with the handle, the handle being in an unlocked, disengaged position to provide selective adjustment of the selectively adjustable, rotational angle.

2. The hand trowel as recited in claim 1, wherein the blade member is configured to provide a notched hand trowel.

3. The hand trowel as recited in claim 1, wherein the blade member is configured to provide a trowel selected from the group consisting of bricklayer trowels, pointing trowels, float trowels, margin trowels, and garden trowels.

4. The hand trowel as recited in claim 1, wherein the gripping member further comprises an ergonomic material.

5. The hand trowel as recited in claim 1, wherein the external mating elements further comprise splines.

6. The hand trowel as recited in claim 1, wherein upon the locking member being loosened from the locked, abutted relationship with the receiving member with the handle, the locking member is withdrawn from the handle, the locking member being in the lock, disengaged position providing for disengagement of the hand trowel handle from the hand trowel.

7. The hand trowel as recited in claim 1, wherein the bore further comprises a plurality of bore portions.

8. The hand trowel as recited in claim 1, wherein the discrete, selectively adjustable, rotational angle further comprises at least four (4) rotational angles.

9. The hand trowel as recited in claim 1, wherein the discrete, selectively adjustable, rotational angle further comprises at least twelve (12) rotational angles.

10. The hand trowel as recited in claim 1, wherein the discrete, selectively adjustable, rotational angle further comprises twenty-four (24) rotational angles.

11. A hand trowel handle comprising:

a handle having a front end region and a rear end region with a gripping member therebetween, the gripping member having an ergonomic shape and a discrete, selectively adjustable, rotational angle, the handle having a bore therethrough with a front opening and a rear opening, the bore having a plurality of internal mating elements circumferentially positioned therearound at the front end region, the plurality of internal mating elements selectively mating with a plurality of external mating elements to define a selectively adjustable, rotational angle of the handle, and a locking member engageable at the rear opening;

wherein upon the locking member being tightened into a locked, abutted relationship with the handle, the handle being in a locked, engaged position to reversibly lock the selectively adjustable, rotational angle; and wherein upon the locking member being loosened from the locked, abutted relationship with the handle, the handle being in an unlocked, disengaged position to provide selective adjustment of the selectively adjustable, rotational angle.

12. The hand trowel handle as recited in claim 11, wherein the gripping member further comprises an ergonomic material.

13. The hand trowel handle as recited in claim 11, wherein upon the locking member being loosened from the locked, abutted relationship with the handle, the locking member is withdrawn from the handle, the locking member being in the unlocked, disengaged position providing for disengagement of the hand trowel handle from a hand trowel.

14. The hand trowel as recited in claim 11, wherein the bore further comprises a plurality of bore portions.

15. The hand trowel handle as recited in claim 11, wherein the discrete, selectively adjustable, rotational angle further comprises at least four (4) rotational angles.

16. The hand trowel handle as recited in claim 11, wherein the discrete, selectively adjustable, rotational angle further comprises at least twelve (12) rotational angles.

17. The hand trowel handle as recited in claim 11, wherein the discrete, selectively adjustable, rotational angle further comprises twenty-four (24) rotational angles.

18. A hand implement handle comprising:

a handle having a front end region and a rear end region with a gripping member therebetween, the gripping member having an ergonomic shape and a discrete, selectively adjustable, rotational angle;

the handle having a bore therethrough with a front opening and a rear opening, the bore having a plurality of internal mating elements circumferentially positioned therearound at the front end region, the plurality of internal mating elements selectively mating with a plurality of external mating elements to define the selectively adjustable, rotational angle of the handle, and a locking member engageable at the rear opening;

wherein upon the locking member being tightened into a locked, abutted relationship with the handle, the handle being in a locked, engaged position to reversibly lock the selectively adjustable, rotational angle; and wherein upon the locking member being loosened from the locked, abutted relationship with the handle, the handle being in an unlocked, disengaged position to provide selective adjustment of the selectively adjustable, rotational angle.

19. The hand implement handle as recited in claim 18, wherein the gripping member further comprises an ergonomic material.

20. The hand implement handle as recited in claim 18, wherein upon the locking member being loosened from the locked, abutted relationship with the handle, the locking member is withdrawn from the handle, the locking member being in the unlocked, disengaged position providing for disengagement of the handle from a hand implement.

21. The hand implement handle as recited in claim 18, wherein the handle is configured for an implement selected from the group consisting of rakes, shovels, hoes, scrapers, paint brushes, flashlights, cameras, wrenches, hammers, power washers, handles for crutches, canes, walkers, lawnmower components, tractors, dollies, motorcycles, and artificial limbs.

* * * * *